Figure 1:
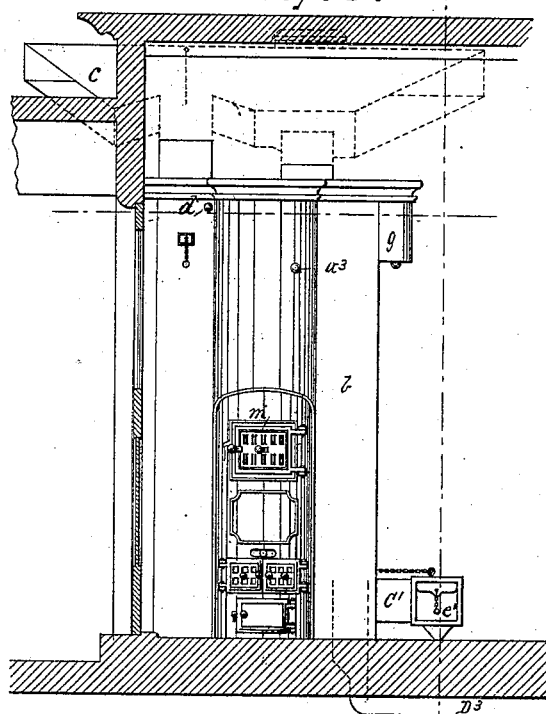

(No Model.) 4 Sheets—Sheet 1.

H. A. GOUGE.
Hot Air Car Heater and Ventilator.

No. 234,666. Patented Nov. 23, 1880.

WITNESSES.
Philip F. Larner
Howell Bartle

INVENTOR,
Henry A. Gouge.
By M. C. Mod
Attorney (No Model.) 4 Sheets—Sheet 2.
H. A. GOUGE.
Hot Air Car Heater and Ventilator.
No. 234,666. Patented Nov. 23, 1880.
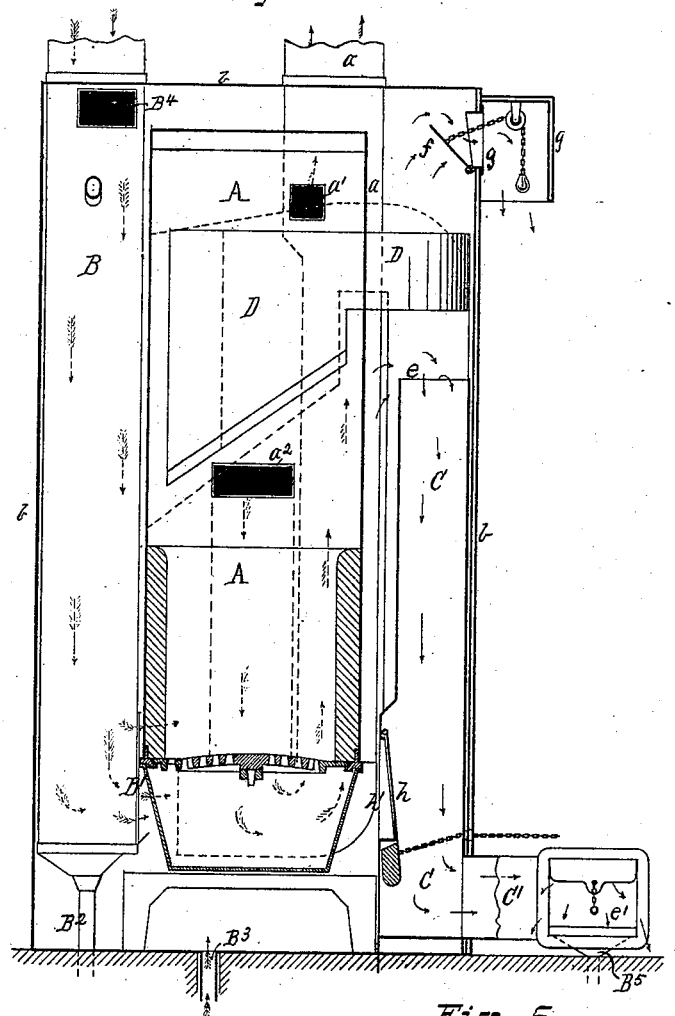
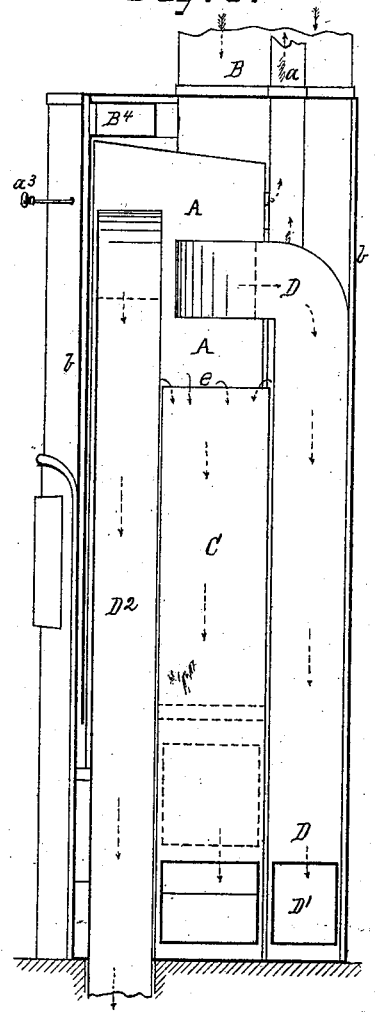
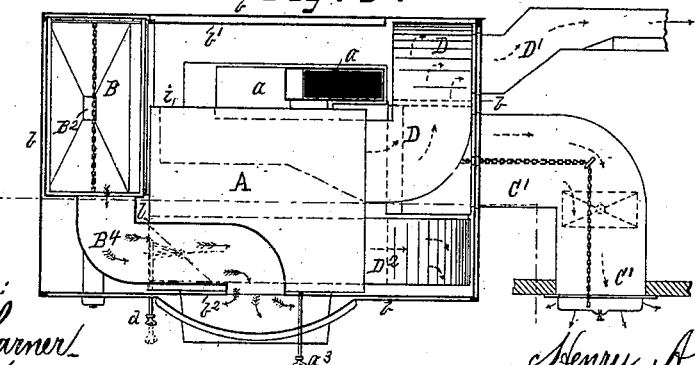
WITNESSES:
Philip F. Larner
Howell Bartle
INVENTOR:
Henry A. Gouge
By Wm. C. Wood
Attorney (No Model.) 4 Sheets—Sheet 3.
H. A. GOUGE.
Hot Air Car Heater and Ventilator.
No. 234,666. Patented Nov. 23, 1880.
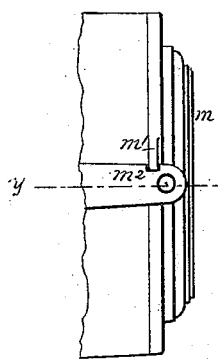
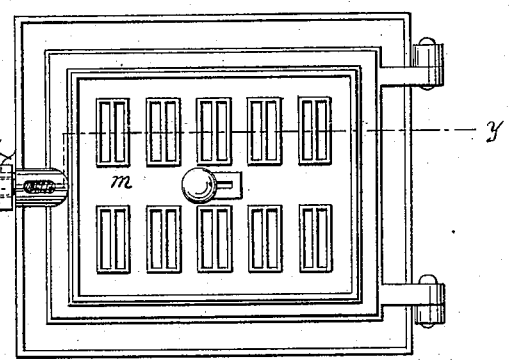
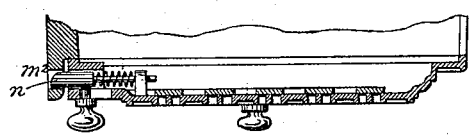
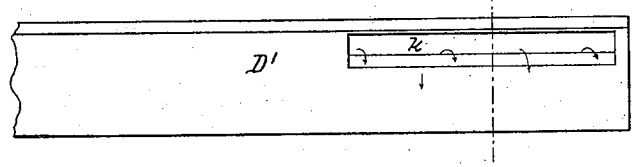
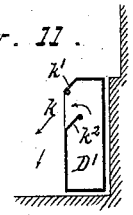
WITNESSES:
Philip F. Larner.
Howell Bartle.
INVENTOR:
Henry A. Gouge.
By [Attorney signature]
Attorney.

(No Model.) 4 Sheets—Sheet 4.

H. A. GOUGE.
Hot Air Car Heater and Ventilator.

No. 234,666. Patented Nov. 23, 1880.

WITNESSES
Philip F. Larner
Howell Bartle

INVENTOR
Henry A. Gouge
By
Attorney.

UNITED STATES PATENT OFFICE.

HENRY A. GOUGE, OF NEW ROCHELLE, NEW YORK.

HOT-AIR CAR HEATER AND VENTILATOR.

SPECIFICATION forming part of Letters Patent No. 234,666, dated November 23, 1880.

Application filed May 5, 1880. (No model.)

*To all whom it may concern:*

Be it known that I, HENRY A. GOUGE, of the city of New Rochelle, county of Westchester, and State of New York, have invented certain new and useful Improvements in Hot-Air Car Heaters and Ventilators; and I do hereby declare that the following specification, taken in connection with the drawings furnished and forming a part of the same, is a clear, true, and complete description of my invention.

My present improvements relate to such apparatus as is shown and described in my Letters Patent No. 184,858, dated November 28, 1876. The car-heater therein described possesses a capacity for delivering heated air locally—i. e., directly from the heater—and also at the end of the car farthest from the heater. Said apparatus is also so constructed and arranged that the air for local delivery is heated to a lower temperature than that which is conveyed to remote portions of the car, and fresh cold air is supplied to the heater under such pressure as is attainable by means of a funnel or hood while the car is in motion. The heating capacity of a furnace in such a heater must be sufficient to heat large volumes of air supplied under pressure while the car is in motion, and when the car is at rest there should be an adequate circulation of cold air around the walls of the furnace to obviate the undue heating of the parts directly exposed to the fire, and in my said Letters Patent provision was made for such a circulation of air while the car is at rest, but it was dependent upon personal care of an attendant; and one object of my present invention is to obviate the necessity of personal supervision in this connection; and, still further, instead of relying upon air from the interior of the car for this cooling circulation, as in my prior apparatus, I have now arranged for a supply of air from outside the car, and in such a manner that the air-ducts provided for that purpose do not unduly affect the proper operation of the apparatus when supplied with air under pressure while the car is in motion, and in this same connection I have also provided for the discharge of air from the heater into the open air when the car is at rest by way of ducts, through which air enters while the car is in motion.

Another object of my present invention is to provide for the graduation of the temperature of the air delivered from the heater—as, for instance, if the furnace be at any time so highly heated as to unduly raise the temperature of the car, I can with my new apparatus, nevertheless, continue to admit the usual quantity of fresh air under pressure to the heater, and so discharge the same into the car as to graduate the temperature without exposure of the passengers to drafts from open doors or windows and without any change in the fire within the heater. I accomplish this result by such an arrangement and control of the air-passages within the heater as enables the diversion of any desired portion of the incoming cold air under pressure from its usual route—i. e., over the highly-heated radiating-surfaces—and permitting more or less of said cold air to directly merge or mix with the local outgoing current of heated air. The value of this portion of my improvement will be obvious when consideration is given to such variations in atmospheric temperature as are observable during any twenty-four hours of a winter's day, incident to day and night as well as to sunshine and storms.

As in my prior apparatus, my present furnace or fire-pot is so thoroughly surrounded with air-spaces, pipes, &c., within the casing of the heater that in the event of a railway accident there is but little liability of fire being communicated to the wood-work of a car; but I have now provided for still greater security against the ejection of fire from the furnace-door under the circumstances named by means of a locking-latch of peculiar construction, which, while it permits the door to be opened readily by an attendant, reduces to a minimum the liability of being accidentally opened.

I have also variously improved upon my former apparatus in the construction and arrangement of the air-ducts, in providing protecting air-spaces at the rear side wall of the heater, which wall is usually closely adjacent to wood-work, and also in sufficiently insulating a portion of the exterior casing of the heater to admit of its being painted, grained, or otherwise finished so as to harmonize with the finish of the adjacent wood-work of the car.

The various features of my invention are hereinafter fully described and made the subject of separate claims at the close of this specification.

To particularly describe my invention I will refer to the accompanying four sheets of drawings, in which—

Figure 2:
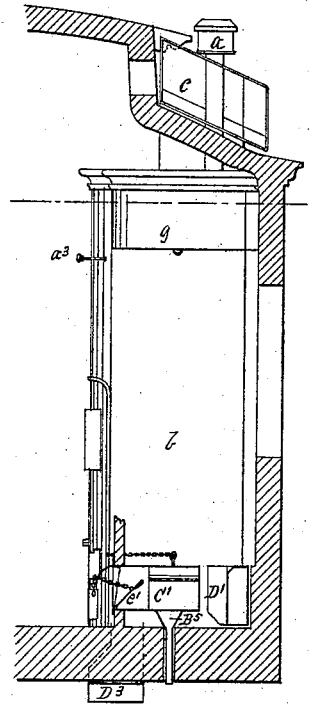
Figure 3:
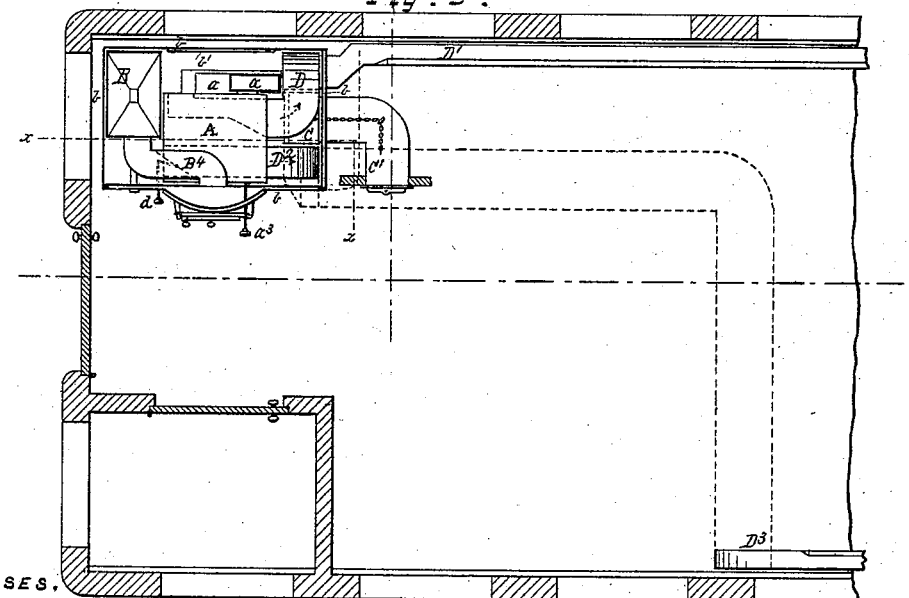
Figure 12:
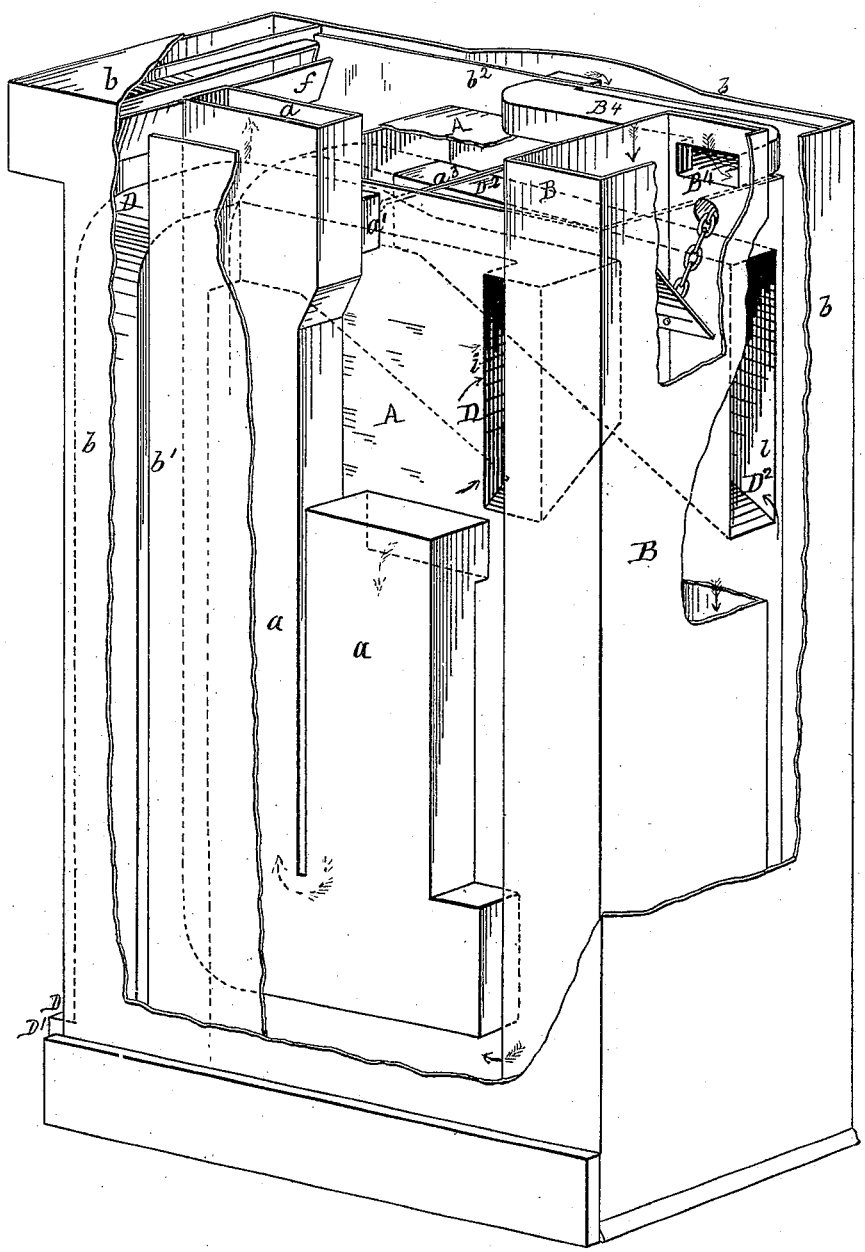

Figure 1, Sheet 1, is a vertical longitudinal sectional view of one end of a passenger-car and a front elevation of my improved heater located therein. Fig. 2, Sheet 1, is a vertical lateral sectional view of a portion of one end of a passenger-car and my heater in side elevation. Fig. 3, Sheet 1, is a horizontal lateral sectional view of one end of a car and a top view of my heater with its cap-plate removed. Fig. 4, Sheet 2, represents my heater in vertical section on rectangular line $x$, Figs. 3 and 6. Fig. 5, Sheet 2, is a side view of the heater with the side of the casing removed. Fig. 6, Sheet 2, is an enlarged top view of the heater with its cap-plate removed. Figs. 7 and 8, Sheet 3, are respectively end and front views of the furnace-door, its casing, and locking-latch. Fig. 9, Sheet 3, is a sectional view of the same on line $y$, Figs. 7 and 8. Figs. 10 and 11, Sheet 3, are respectively a side view and a section of a hot-air duct containing my improved deflector. Fig. 12, Sheet 4, is a rear isometric elevation of the heater, with portions broken away to disclose interior parts.

My present fire-chamber A is substantially like that shown in my prior Letters Patent. It is rectangular in form and communicates, as before, with the smoke-flue $a$ at two points, the upper port, $a'$, being opened when the fire is first started, and the lower port, $a^2$, being thereafter relied upon.

The smoke-flue, as before, is a diving-flue from the lower opening, $a^2$, and at a point near the ash-pan it turns upward and extends through the top of the heater and through the top of the car, as clearly indicated in Figs. 2, 4, 5, and 6.

For controlling the upper smoke-flue port, $a'$, I have now provided a damper or valve operated by the rod $a^3$.

Instead of leaving the upper port always fully open, as in my prior apparatus, it may now be left only sufficiently opened to allow the escape of noxious gases.

As in my prior apparatus, the entire space between the walls of the fire-chamber and the outer casing constitutes an air-heating chamber.

The casing $b$ in my present apparatus at the rear of the heater is insulated from direct radiation from the fire-chamber and the smoke-flue by means of a guard-plate, $b'$, between which and the casing is an air-space, and at the front the casing is also insulated or protected by the guard-plate $b^2$, as shown in Fig. 6.

In my present apparatus I employ the air-injecting hood $c$ and also the several features of invention described and claimed in my prior Letters Patent before herein referred to, although I have now somewhat modified and improved the construction and arrangement of those portions of the apparatus which are described in said Letters Patent in connection with separately heating different portions of the air received by the heater, and also in connection with the disposal of dust and cinders introduced with the air.

Instead of having, as before, separate cold-air ducts for two differently-heated portions of the air-chamber supplied by the same injecting-hood, I now employ but one duct, as at B, Figs. 1 to 6, inclusive, which extends downward at one corner of the heater within the casing to a point opposite the ash-pan of the furnace, where the main portion of the air is laterally discharged through a large opening, B', into the lower portion of the air-space below the furnace. In connection with this air-duct I provide means for disposing of cinders and dirt preferable to those provided in my former apparatus, in that, instead of leaving the caught cinders, &c., within the casing, they are discharged into the open air beneath the car.

The lower end of the air-duct B is funnel-shaped and terminates in an open tube, $B^2$, of small diameter, through which the dirt and cinders are forced and discharged while the car is in motion, and through which upward currents of air may freely pass when the car is at rest for partially preventing the furnace from being unduly heated.

The cold-air duct B has near its top a hinged valve controlled by a chain, as clearly shown, whereby the supply of fresh air may be varied.

As a further provision for supplying cooling currents of air to the heater while the car is at rest, I provide the cold-air duct $B^3$, Fig. 4, which extends from the air-space beneath the ash-pit through the floor of the car, and that duct also serves as a discharge-outlet for dust, cinders, &c., because while the air-space is filled with air under pressure—i. e., while the car is in motion—more or less of the air passes downward through said duct, carrying with it such solid matters as are within its influence; but when the car is at rest the cold air freely enters to take the place of the air which, on being heated, rises and is discharged from the heater into the car, as hereinafter described.

For the double purpose of preventing the front portion of the heater-casing from being unduly heated, both when the car is in motion and when at rest, I have provided the small cold-air duct $B^4$, Figs. 4, 5, and 6, which communicates with the main cold-air duct B near the top of the heater, extends through the front guard-plate, $b^2$, and delivers a small portion of the cold air directly into the upper portion of the space between said guard-plate and the swell front of the casing. When the car is at rest the air-currents are at once reversed, because the cold air entering through the bottom of the car via ducts $B^2$ and $B^3$, on being heated, rises and has free exit to the open air via duct B⁴ and main cold-air duct B. As, however, this wasteful discharge of heated air will be only warranted when not needed within the car, or when the discharge of hot air into the car is not sufficiently great to properly keep down the temperature of the furnace, I prefer to provide the air-duct B⁴ with a damper controlled by rod $d$.

There is still another provision for the free discharge of cinders and dirt which are carried into the heater. The open funnel-pipe B⁵, Figs. 1, 2, 4, and 6, serves as an exit for cinders and dirt; but as that pipe is employed in connection with a reversible hot-air and cold-air duct, it will be hereinafter more particularly referred to.

It will be understood that my present apparatus, like that already patented, is located in one corner of a car, as indicated in Fig. 3, and discharges air locally at the desired temperature, and that it also delivers air at the opposite end of the car at nearly the same temperature as the air which is discharged at the heater; also, that in order to provide for this uniformity of temperature the air which is remotely delivered is heated by the heater to a higher degree than the air delivered locally, because of the radiation of heat from the long hot-air ducts before its discharge at their outer ends.

In describing the several hot-air ducts I will first describe that by which the local delivery of hot air is effected. The local hot-air duct C is located centrally within the casing, between one end thereof and the adjacent wall of the fire-chamber A. It extends from the bottom of the heater upward about two-thirds of the height of the heater, has an open top at $e$, and is connected at the bottom with an elbow-pipe, C', provided with a valve or gate, $e'$, controlled by a cord or chain. A deflector at the mouth of pipe C' causes the outflowing hot air to be discharged downward toward the floor of the car. It is within the pipe C' that the funnel-pipe B⁵, before referred to, is located. The valve $e'$ opens inward and is hinged at its lower edge, so that there can be no outwardly-sweeping current over the bottom of the pipe, and therefore such solid matter as may enter with the forced cold air and reach this pipe is assuredly discharged through the funnel-pipe B⁵, instead of escaping into the car.

It will readily be seen that when the car is in motion the incoming cold air will force a portion of the heated air in the upper portion of the heater into and through the hot-air duct C and elbow C' and discharge it locally into the car. When the car is at rest, however, no forcing pressure exists; and to provide for the free discharge of hot air I employ the automatic valve $f$, guarding a hooded opening, $g$, at one side of the heater, near its top. This valve $f$ is so weighted that it will be closed by the air under pressure when the car is in motion; and, if desired, it can be promptly opened when the car stops, and immediately thereafter the hot-air duct C C' becomes a cold-air duct, through which air from near the floor of the car passes inward, upward, and thence outward, when heated, through the hooded opening, not then closed by the valve $f$, and the supply of air thus entering from the car is supplemented by the fresh cold air entering via pipes B², B³, and B⁵.

In case the hooded hot-air opening at $g$ be insufficient in its hot-air-discharging capacity the cold-air duct B⁴ permits a discharge through it and the cold-air duct B upward through the hood $c$ into the open air. As soon as the car starts and air-pressure is resumed within the heater the valve $f$ automatically closes because of internal pressure thereon, and the air-duct C then resumes its function as a hot-air duct.

It is well known that if a car-heater be located at the rear end of a car, as made up in a train, said rear end is liable to be more highly heated than the front end of the car, and therefore I have devised means whereby the locally-discharged air may be mixed to any desired degree with the cold air freshly admitted. Opposite the ash-pan and within the duct C, near its bottom, I have provided a valve, $h$, which is hinged at the top, heavily weighted at the bottom, normally closed, and provided with a cord or chain by which it may be opened to any desired extent and secured in that position. The opening $h'$, guarded by valve $h$, communicates directly with the air-space at the bottom of the heater, opposite the discharge-opening B' of the cold-air duct B, and therefore when said valve is opened cold air passes through said opening directly into the hot-air duct C, mixes with the heated air therein, and modifies its temperature. When the car is at rest, if said valve be opened a portion of the cold air from near the car-floor, entering at C', will pass through opening $h'$ and ascend in cooling contact with the radiating-surfaces, as before described. The weight of the lower end of the valve $h$ is sufficient to maintain it in a closed position notwithstanding the ordinary pressure of air within the heater.

I have in this apparatus an air-space door below the ash-pan door, as shown in my prior Letters Patent, and that door may be opened when the car is at rest, if desired, to admit air from the car to the heater; but it need seldom be thus opened, on account of the fresh cold-air supply by way of the pipes B², B³, and B⁵, and because of the reversible air-currents in the hot and cold air duct C C'.

I will next describe the hot-air ducts by which a portion of the air is specially heated and conveyed to the opposite end of the car.

Instead of having the separately-constructed chamber for heating this portion of the air, as shown in my prior Letters Patent, I now attain better results by locating the inner ends of two hot-air ducts within the fire-chamber itself, so that the air passing into said ducts from the common air-space of the heater is exposed to radiation of heat from the walls of the ducts for such a length thereof as is equal to the width of the fire-chamber, through which they pass. These interior ducts connect with outside ducts, one for each side of the car.

The hot-air duct D has its entrance at $i$, Fig. 6, in the vertical rear wall of the fire-chamber A, near its top; but the mouth and adjacent end of said duct is enlarged for attaining an extensive radiating-surface within the fire-chamber, through which it passes, as shown in solid lines in Fig. 4, and indicated in dotted lines in Fig. 6, and thence from near the top of the fire-chamber it extends horizontally rearward, thence downward, and thence outward through the casing of the heater into the long hot-air duct D', which extends along the side of the car to its farther end, as indicated in Fig. 3, at which point the hot air is discharged through an opening, $k$, of peculiar construction, as indicated in Figs. 10 and 11.

In my prior patented apparatus I provided for a downward deflection of the hot air by means of projecting curved hoods; but as they occupy valuable space in the car, I have devised a novel deflector which is wholly within the duct. This deflector consists of a curved or downwardly-inclined upper front edge of the duct, as at $k'$, Fig. 11, and an inward upwardly-inclined plate, $k^2$, between which and the top of the duct the hot air passes, and is thereby deflected toward the floor of the car.

Another interior hot-air duct is shown at $D^2$ for furnishing air to a second outside duct, $D^3$, which crosses the car beneath the floor from the heater, instead of crossing above the car-aisle, as in my prior apparatus.

The entrance to the hot-air duct $D^2$ is at $l$, near the top, on the side of the fire-chamber nearest the cold-air duct B, and, like duct D, this duct passes through the fire-chamber, thence directly downward through the floor of the car, where it connects with the distributing-duct $D^3$, which extends longitudinally beneath the floor for a short distance, thence across the car, thence upward through the floor, and thence along the side of the car on the floor to its farther end, like its fellow on the opposite side of the car. The upper and lower walls of the duct $D^2$ within the fire-chamber are indicated by dotted lines in Fig. 4, and the side walls by dotted lines in Fig. 6.

The arrows employed in the drawings for indicating direction of currents may be recognized as follows: the full-feathered arrows indicate cold air, half-feathered arrows indicate smoke, and the plain arrows indicate hot air.

When the car is running with the heater at its rear end it is sometimes desirable that all the heated air be delivered at the front end of the car, and thence permit it to circulate rearward, in which case the valve in the local hot-air duct C' may be wholly closed.

The locking-latch for the furnace-door illustrated in Figs. 7, 8, and 9 is complex in its construction, in that it combines the characteristics of the ordinary lifting-latch and keeper and the beveled-face latch-bolt and keeper, all of which render the door secure against accidental opening in case of accident to the car.

The peculiar locking arrangement for the door, although novel with me, is not herein claimed, because I propose to make it the subject of a separate application for Letters Patent.

The door $m$, as heretofore, has a slight play on its hinges, so as to admit of a slight upward movement of the latch-tongue $m'$, which is integral with the door. The latch-keeper $m^2$ is also in part as heretofore, having a rounded or beveled edge, over which the latch-tongue passes in reaching the usual retaining-recess in the keeper. The spring latch-bolt $n$ has a beveled face, and so has the keeper or striker $m^2$ on its side, which causes the bolt to retire as the door is forced toward the keeper. When the door is properly closed the bolt is forced by its spring into its keeper, which is a lateral hole in the keeper $m^2$. It will be seen that the lifting-latch is maintained securely in its keeper by the latch-bolt, and that to open the door the latch-bolt must first be wholly withdrawn from its keeper and the door then lifted by means of the knob on the latch-bolt for releasing the lifting-latch from its keeper, and that the lines of force or pressure required from these two movements are at right angles to each other, which practically precludes the accidental opening of the door.

The operation of my improved apparatus under the several conditions incident to heating passenger-cars has been fully explained in connection with the detailed description herein given.

Having thus described my invention, I claim as new, to be secured by Letters Patent—

1. In a hot-air car-heating apparatus having a cold-air duct and a hood for supplying fresh air under pressure while the car is in motion, the combination of a duct or ducts for supplying air to the heater when the car is at rest, an exit-aperture for hot-air, and a valve at said aperture which is automatically closed and maintained in a closed position by the pressure of air within the heater when the car is in motion and readily opened and left open while the car is at rest, substantially as described.

2. In a hot-air car-heating apparatus, the combination, with the main cold-air duct and its hood, of an outlet to the open air at the base of said duct, for the discharge of cinders and dirt while the car is in motion and for the admission of cold air when the car is at rest, substantially as described.

3. In a hot-air car-heating apparatus, the combination, with a cold-air duct and its hood for supplying fresh air under pressure, of the outlet for hot air near the top of the heater and one or more cold-air ducts entering from beneath the heater, substantially as described, whereby when the car is at rest fresh air is supplied to the heater and discharged therefrom into the car, and also whereby while the car is in motion air accompanied with dust, &c., is forced outward through the ducts beneath the heater, as set forth.

4. In a hot-air car-heating apparatus, the combination, with the main cold-air duct and its hood, of the branch duct near the top of the heater communicating with the main duct and with the upper portion of the air-heating chamber, substantially as described, whereby when the car is in motion fresh air is forced through the branch duct into the heater, and hot air is discharged from the heater through said branch duct and the main duct into the open air when the car is at rest, as set forth.

5. In a hot-air car-heating apparatus, the combination of a hooded cold-air duct for supplying fresh air under pressure, a hot-air discharge-aperture near the top of the heater, and the duct which discharges hot air near the bottom of the heater when the car is in motion and admits air to the heater when the car is at rest, substantially as described.

6. In a hot-air car-heating apparatus, the combination of the cold-air duct and its hood, the hot-air duct, and the valve or gate, whereby fresh cold air may be mixed with the outgoing heated air, substantially as described.

7. A hot-air duct for heating cars having a curved or inclined top, an opening in its side, and an interior plate inclined inward and upward below said opening, substantially as described.

HENRY A. GOUGE.

Witnesses:
A. J. SAVAGE,
DAVID S. TOMPKINS.